April 16, 1968 G. E. FENNER 3,378,648

DOPED PIEZORESISTIVE PHONOGRAPH PICKUP

Filed Dec. 31, 1964

INVENTOR:
GUNTHER E. FENNER,

BY Thomas A. Briody

HIS ATTORNEY.

United States Patent Office 3,378,648

Patented Apr. 16, 1968

3,378,648

DOPED PIEZORESISTIVE PHONOGRAPH PICKUP

Gunther E. Fenner, Schenectady, N.Y., assignor to General Electric Company, a corporation of New York Filed Dec. 31, 1964, Ser. No. 422,623
5 Claims. (Cl. 179—100.41)

ABSTRACT OF THE DISCLOSURE

A phonograph pickup which utilizes a single crystal of semiconductor material having an area thereof doped with an impurity to provide an element with piezoresistive characteristics.

This invention relates generally to a pickup device for the conversion of mechanical displacements into an electrical signal for reproducing sounds recorded on a monaural or stereophonic record. More particularly, this invention relates to a pickup device for monaural and stereophonographs comprising a piezoresistive element.

In the past many methods have been suggested for converting sound recordings on a phonograph record to electrical signals for reproduction of the sounds. One such method uses magnetic means for converting the displacement of a stylus into an electrical signal, but perhaps the most common form of transducer now in use is that utilizing piezoelectric transducer elements. A stylus is used to obtain a mechanical displacement from the sound recorded on the phonograph record. The mechanical displacement of the stylus is transmitted to piezoelectric elements which produce an electrical output when strained by the mechanical displacement of the stylus. The electrical signals obtained from the piezoelectric elements are then used to reconstruct the audio signal appearing on the record.

While these piezoelectric elements have been used quite extensively and are generally satisfactory, the advance of technology has somewhat limited their usefulness. In particular, the increased use of transistors and other solid state devices has opened the way to increasingly compact circuitry. However, a transistor amplifier needs a relatively low generator impedance for most effective operation. Piezoelectric devices have a generator impedance which is too high to permit the most effective use of transistorized amplifiers. Thus, the phonograph pickups now in use prevent maximum optimization of the more compact transistorized circuitry. To obviate these difficulties and permit most efficient use of transistorized circuits, the present invention utilizes piezoresistive elements in the phonograph pickup.

Therefore, it is a primary object of this invention to provide a phonograph pickup which permits optimization of transistorized circuitry in a phonograph reproducer.

Another object of this invention is to provide a phonograph pickup which yields a large electrical output without excessive size.

Another object of this invention is to provide a phonograph pickup having a low generator impedance.

Briefly, in one form thereof, this invention involves the use of a piezoresistive element in a phonograph pickup. The piezoresistive element is achieved by doping a portion of a semiconductor base, such as a silicon, with an impurity of the n or p-type. Impurity doping the portion provides a semiconductor of increased conductivity so that the piezoresistive effect can be utilized. This impurity-doped portion then forms a piezoresistive element. The impurity-doped piezoresistive element is provided with a pair of leads conducting an electrical signal. Variations in the surface of a phonograph record which are representations of audio signals impressed upon the record are detected by some means, such as a conventional stylus. The variations in the surface of the phonograph record produce mechanical displacements which are transmitted through the detecting means to the semiconductor, where the displacements provide a bending force directly related to the sound representations on the record. The bending force is transmitted to the piezoresistive element so that the resistance of the element varies in accordance with the strain, which is proportional to the magnitude of the bending force. As the resistance of the piezoresistive element is varied, the electrical signal across the element is correspondingly varied and an indication of the audio signal impressed upon the phonograph record is obtained from the pair of leads connected to the element. The element is positioned on the semiconductor base in such a manner that forces at right angles to the bending force produce no piezoresistive effect. Equivalent results for a stereophonic recording are achieved by utilizing a semiconductor bar having a completely symmetrical cross-section upon which two of the piezoresistive elements are formed. The two piezoresistive elements are arranged so that one element is responsive to one channel of the stereophonic recording and the other element is responsive to the other channel of the recording.

The novel and distinctive features of the invention are set forth in the appended claims. The invention itself, together with further objects and advantages thereof, may be understood by reference to the following description and accompanying drawings in which:

Figure 1:
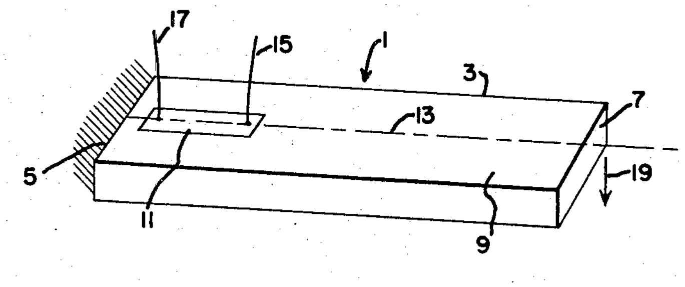
FIG. 1 is a perspective view of a single channel piezoresistive pickup device.

Referring now to FIG. 1, a single channel phonograph pickup 1 is shown. The pickup device 1 has as its main constituent a semiconductor body 3. Semiconductor body 3 has a rigidly fixed end 5 and a free end 7. In this particular embodiment, the semiconductor body 3 is preferably a single crystal of a semiconductor material such as silicon. The single crystal of semiconductor material is in rectangular wafer form and has dimensions approximately the same as the dimensions of the piezoelectric elements in prior art transducers.

On one of the broad surfaces 9 of the semiconductor crystal 3 there is formed a piezoresistive element 11. Piezoresistive element 11 is located near the rigidly supported end 5 of semiconductor crystal 3 and has roughly the same shape as the crystal 3, but on a smaller scale. Element 11 is carefully positioned on the centerline 13 of the semiconductor crystal surface 9.

Piezoresistive element 11 is formed by doping a selected area of semiconductor crystal 3 with impurities of either the acceptor or donor type. The preferred embodiment has impurities of the donor, or n-type, placed in the selected area. Doping of the area produces a greater amount of conducting atoms in the prescribed areas so that changes in resistivity of the area are greatly magnified over those of other areas of the semiconductor material. The presence of conductive impurities also permits the area, which becomes the piezoresistive element 11, to carry current without too large a power loss.

On either end of the piezoresistive element 11 there are leads 15 and 17. Leads 15 and 17 are provided with a suitable source of power such that there is a normal current flow through element 11. The current flow through element 11 depends upon the resistance of the element, which in turn depends upon the stress applied to the piezoresistive element. A change in resistance of the element 11 is brought about by a bending force applied to the crystal 3. This bending force is indicated generally at 19. Bending force 19 is directly related to variations in the surface of a phonograph record. The variations in the surface of a phonograph record are representations of sounds that have previously been recorded on the surface. The sound representations are detected, e.g. by the use of an ordinary stylus, and transmitted to the semiconductor crystal 3 as the force 19. Bending force 19 causes crystal 3 to be deformed and as a consequence a strain proportional to bending force 19 is applied to the piezoresistive element 11. The strain applied to element 11 produces a change in the resistance of the element and a resultant change in the electrical signal obtained from leads 15 and 17 is realized. Forces at right angles to bending force 19 will not produce any piezoresistive effect because the element is carefully located on the centerline 13, which is the neutral line with respect to bending by a force at right angles to force 19.

Figure 2:
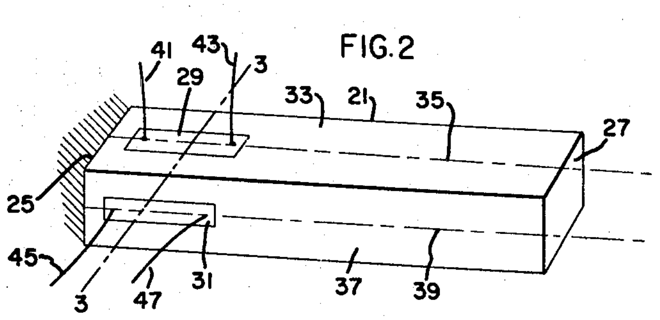
FIG. 2 is a perspective view of a piezoresistive pickup device which may be used for a stereophonic phonograph.
Figure 3:
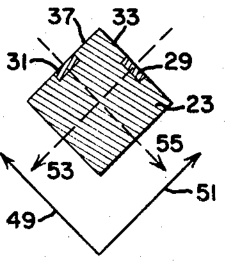
FIG. 3 is a cross-sectional view along line 3—3 of FIG. 2 and further including a schematic illustration of two channels of a stereo phonograph.

FIGS. 2 and 3 illustrate an embodiment of the invention which is useful for providing pickup of a stereophonic signal. In this embodiment the semiconductor is formed into a bar 21 having a square cross-section 23. As in the embodiment of FIG. 1, the bar 21 may be formed of any semiconductive material such as silicon. Bar 21 has end 25 rigidly fixed, and end 27 in a free condition. Located on the silicon bar 21 are two piezoresistive elements 29 and 31. Piezoresistive element 29 is located on side 33 of bar 21, carefully positioned on the centerline 35 of side 33. The piezoresistive element 31 is located on side 37 of bar 21, carefully positioned on the centerline 39 of side 37. The placing and formation of each of these piezoresistive elements is similar to that of element 11 in the embodiment of FIG. 1. Element 29 is provided with leads 41 and 43, and element 31 is provided with leads 45 and 47.

The performance of the stereophonic pickup device may be best understood with the aid of FIG. 3. There the elements 29 and 31 are shown in conjunction with the channels of a stereophonic record indicated graphically as 49 and 51. Side 33 and element 29 are located parallel to channel 49, while side 37 and element 31 are parallel to channel 51. Thus, the resistance of element 29 is varied by a bending force 53 in the same manner that the resistance of element 11 is varied by the bending force 19. Similarly, element 31 has its resistance varied by the bending force 55. However, bending force 55 produces no change in element 29 and bending force 53 produces no change in element 31, because each of the elements is placed along a neutral line of the bar with respect to bending by these forces. Thus, a single pickup device for a stereophonic recording is achieved, with element 29 and element 31 each acting substantially the same as element 11 in the embodiment of FIG. 1, and yet both of the elements 29 and 31 are independent of each other to the degree that bending which produces the desired piezoresistive effective in one introduces no such effect in the other.

Figure 4:
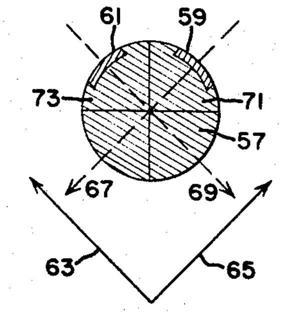
FIG. 4 is a cross-sectional view similar to FIG. 3 showing another embodiment of the pickup device of FIG. 2.

Another embodiment of a stereophonic phonograph pickup is illustrated in FIG. 4. This embodiment differs from that of FIG. 3 in that the semiconductor bar has a circular cross-section 57. The piezoresistive elements 59 and 61 are essentially the same as the piezoresistive elements 29 and 31 in the embodiment of FIGS. 2 and 3. Channels 63 and 65 correspond to channels 49 and 51 of FIG. 3. Similarly, bending forces 67 and 69 correspond to bending forces 53 and 55. As in the embodiment of FIG. 3, each element is made independent of the bending force which produces piezoresistivity in the other element by centering each element in its quadrant (element 59 in quadrant 71, element 61 in quadrant 73). Centering of the element is achieved by locating it along a line which bisects the angle of the quadrant in which it is located.

The embodiment of FIG. 4 is of particular importance if uniformity of compliance is a necessity in the system. It should be noted that the embodiments of FIGS. 3 and 4 are not the only configurations which would work to provide stereophonic pickup, but that any bar having a completely symmetrical cross-section would be equally suitable.

In general the piezoresistance effect in semiconductive materials is anisotropic. Thus, the orientation of the crystallographic axes is selected advantageously to maximize the piezoresistance effect in most cases. For example, centerline 13 in FIGURE 1, i.e. the longitudinal axis, is preferably selected to coincide with the <111> crystallographic axis for P-type silicon and N-type germanium crystals, or the <100> crystallographic axis in the case of an N-type silicon crystal. The crystallographic axes referred to by the above symbols are defined in an article by R. W. Keyes, "The Effects of Elastic Deformation on the Electrical Conductivity of Semiconductors," Solid State Physics, volume 11, Academic Press, 1960.

Although the invention has been described with respect to certain specific embodiments, it will be appreciated that modifications and changes may be made by those skilled in the art without departing from the basic teachings of the invention. Therefore, it is desired not to limit the following claims to the specific embodiments shown, but to cover all modifications and changes within the spirit and scope of the invention.

What is claimed as new and desired to be secured by Letters Patent of the United States is:

1. A phonograph pickup comprising: a single crystal of semiconductive material; an area of said crystal being doped with an impurity to provide an element having piezoresistive characteristics; a pair of leads connected to said piezoresistive element; means for applying to said crystal a variable bending force directly related to representations of sounds formed in a phonographic record, whereby a strain proportional to said bending force is placed on said piezoresistive element to regulate the resistance of said element and thereby control the signal obtained from said leads.

2. A phonograph pickup as recited in claim 1 wherein said crystal is a silicon wafer; means for locating said element on said wafer in such a manner that said element demonstrates maximum piezoresistivity in response to said bending force and negligible piezoresistivity to a force at right angles to said bending force.

3. A pickup for a stereophonograph comprising: a bar formed of semiconductive material and having a symmetrical cross-section; a first area of said bar being doped with an impurity to provide a first element having piezoresistive characteristics; a second area of said bar being doped with an impurity to provide a second element having piezoresistive characteristics; a pair of leads connected to each of said piezoresistive elements; means for applying a pair of variable bending forces to said bar; a first of said pair of bending forces being directly related to representations of sounds in a first channel of a stereophonograph record, whereby a strain proportional to said first bending force is placed on said first piezoresistive element to regulate the resistance of said first element and thereby control the signal obtained from the leads connected to said first element; a second of said pair of bending forces being directly related to representations of sounds in a second channel of a stereophonograph record, whereby a strain proportional to said second bending force is placed on said second piezoresistive element to regulate the resistance of said second element and thereby control the signal obtained from the leads connected to said second element; and means for locating said elements on said bar in such a manner that a bending force from one channel produces a piezoresistive effect in one element but does not produce a piezoresistive effect in the other element.

4. A pickup for a stereophonograph as recited in claim 3 wherein said bar has a square cross-section and said elements are centered on adjacent sides of the square.

5. A pickup for a stereophonograph as recited in claim 3 wherein said bar has a circular cross-section and said elements are centered in adjacent quadrants.

References Cited

UNITED STATES PATENTS

| | | | |
|---|---|---|---|
| 2,476,848 | 7/1949 | Eckhardt | 179—100.4 |
| 3,144,522 | 8/1964 | Bernstein | 179—100.4 |

OTHER REFERENCES

Bell Lab. Record, vol. 37, January 1959, pages 7–9.

BERNARD KONICK, *Primary Examiner.*

L. HILL, R. F. CARDILLO, *Assistant Examiners.*